Figure 1:
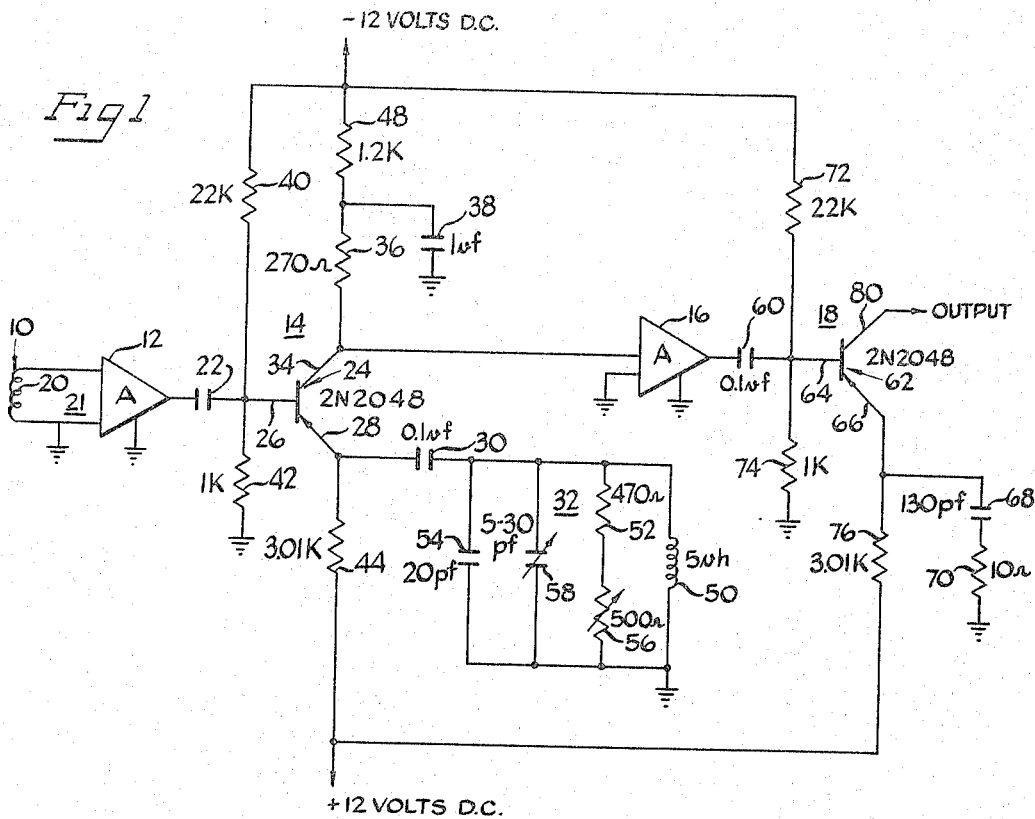

April 25, 1967  C. H. COLEMAN, JR., ETAL  3,316,360
HEAD RESONANCE COMPENSATOR
Filed Aug. 30, 1963

INVENTORS
CHARLES H. COLEMAN, JR.
MICHAEL O. FELIX &
PETER W. JENSEN

BY Robert S. Clay
Atty's

United States Patent Office 3,316,360
Patented Apr. 25, 1967

3,316,360
HEAD RESONANCE COMPENSATOR
Charles H. Coleman, Jr., Belmont, Michael O. Felix, San Carlos, and Peter W. Jensen, Fremont, Calif., assignors to Ampex Corporation, Redwood City, Calif., a corporation of California
Filed Aug. 30, 1963, Ser. No. 305,740
5 Claims. (Cl. 179—100.2)

The present invention relates to circuits for magnetic reproducers and, more particularly, to a circuit for compensating for distortion caused by resonance of a magnetic transducer head.

Normally in magnetic reproducers, the signal that is recorded on a record medium as, for example, magnetic tape, is reproduced by a transducer head. The transducer head includes a core having a gap therein and a winding wrapped about the core. Magnetic flux produced by the previously recorded signal on the record medium intersects the core at the gap and thereby causes magnetic flux to flow through the core. Variations in the core flux induces a current in the winding which current is suitably amplified and coupled to subsequent circuits of the reproducer.

Amplifiers have an input capacity, either actual or distributed, and at higher frequencies, the input capacity resonates with the inductance of the head coil. For lower frequency reproducers, the resonant frequency of the circuit is selected so as to be above the bandpass of the reproducer and, hence, has little effect on the reproduced signal. However, in high frequency reproducers, such as the reproducers commonly employed to reproduce television signals from magnetic tape, the resonant frequency is placed in the extreme upper limit of the signal bandpass of the reproducer in order to obtain the best signal-to-noise ratio. Unless compensated for, this positioning of the resonant frequency causes amplitude and phase distortion in the reproduced signal.

An object of the present invention is the provision of a circuit for compensating for distortion caused by the resonance of a magnetic head transducer. Another object of the invention is the provision of a circuit for accurately compensating for phase and amplitude distortion caused by resonance of a magnetic transducer head in a television tape reproducer. Still a further object is the provision of a circuit for compensating for head resonance, which circuit is relatively inexpensive to manufacture and simple to adjust.

Other objects and advantages of the present invention will become apparent by reference to the following description and accompanying drawings.

Figure 2:
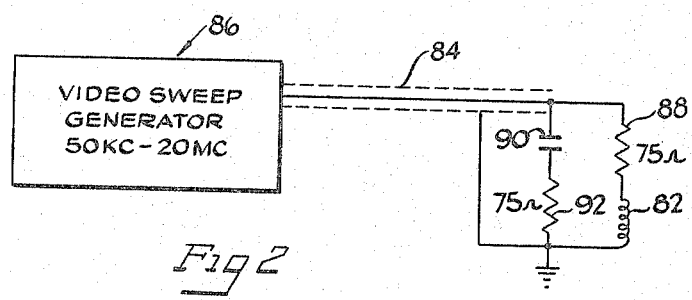

In the drawings:

FIGURE 1 is a schematic circuit diagram of a compensating circuit showing various features of the present invention; and FIGURE 2 is a schematic circuit diagram of a device for adjusting the compensating circuit shown in FIGURE 1.

The circuit shown in the drawings is designed to compensate for phase and amplitude distortion caused by resonance of a magnetic transducer head. Briefly, the circuit comprises a transducer head 10 which is connected through an amplifying circuit 12 to a first stage 14 which partially compensates for the resonance of the transducer head. The first stage 14 produces an output signal which decreases in amplitude in direct proportion to the frequency of tthe input signal. To compensate for this decrease in amplitude, the output signal is fed through an amplifier 16 to a second stage 18 which produces an output signal which increases in amplitude in direct proportion to the frequency of an input signal. Since the input signal to this second stage 18 decreases with frequency, the output signal from this stage is a signal which is not affected in amplitude by the frequency.

More specifically, the transducer head 10 may be a conventional transducer head such as that employed in a video tape recorder/reproducer. The transducer head 10 includes a core (not shown) having a winding 20 thereon. The winding or coil is connected to the input of the amplifying circuit 12 which may include at least one conventional voltage amplifier coupled to a conventional impedance matching means, such as a transistor in a grounded collector configuration. The winding 20 of the transducer head 10 and the circuit to which it is connected have inductance, capacity and resistance, which may be made up of distributed or actual capacity. At a frequency near the upper limit of the reproduced frequencies, the inductance resonates with the capacity. In other words, the inductance, the resistance and the capacity act like a series resonant circuit (hereinafter referred to as the head circuit 21). This produces a change in the phase of the signal generated by the magnetic field of the recording medium. The generated signal is also increased in amplitude.

In the illustrated embodiment, the signal applied to the input of the amplifying circuit 12 is amplified by the same and is coupled through a coupling capacitor 22 to the input of the first stage 14 of compensation. The first stage 14 includes a pnp transistor 24 in a common emitter configuration. In this connection, the input signal of the first stage 14 is applied to the base 26 of the transistor 24. The emitter 28 of the transistor 24 is connected through a coupling capacitor 30 to a parallel resonance network 32. The other side of the parallel resonance network 32 is connected to ground. The collector 34 of the transistor 24 is connected through a load resistor 36 and a bypass capacitor 38 to ground.

The base 26 of the transistor 24 is biased by connecting the same to the junction between a pair of resistors 40 and 42. The negative terminal of a D.-C. power source (not shown) is coupled to the resistor 40 and the other resistor 42 is coupled to ground. The emitter 28 of the transistor 24 is positively biased by connecting the positive terminal of a D.-C. power supply (not shown) through an isolating resistor 44 to the emitter. The collector 34 of the transistor 24 is made negative relative to ground by connecting the negative terminal of the first mentioned D.-C. power source through an isolating resistor 48 to the junction between the bypass capacitor 38 and the collector load resistor 36.

The biasing of the transistor 24 is selected so that the internal base to emitter impedance of the transistor 24 is low compared to the impedance of the resonance network within the range of signal frequencies. In this way, the voltage across the resonance network closely approaches the input voltage to the transistor within the range of signals being reproduced.

As shown in FIGURE 1, the resonance network 32 includes an inductor 50, a resistor 52 and a capacitor 54 connected in parallel between the coupling capacitor 30 and ground. A potentiometer 56 is connected in series with the resistor 52 so that the resistance in the resonance network may be varied. Likewise, a variable capacitor 58 is connected across the capacitor 54 so that the capacity of the resonance network may be varied.

The variable capacitor 58 in the resonance network 32 is adjusted until the resonant frequency of the resonance network 32 equals the resonant frequency of the head circuit 21. In this connection, the product of the inductance and capacity of the resonance network 32 is made equal to the product of the head inductance and the input capacity in the head circuit 21. Also, at the resonant frequency the quality factor (Q) of the resonance network 32 is made equal to the quality factor (Q) of the head circuit 21. In this connection, the product of the inductance and conductance of the resonance circuit 32 is made equal to the product of the capacity and resistance of the head circuit 21.

When the resonance circuit 32 is adjusted, as described above, the output signal from the first stage 14 of compensation is indirectly proportional (6 db per octave slope) to the frequency of the reproduced signal (assuming a constant amplitude reproduced signal). The output signal is coupled through the amplifier 16, which may be an impedance matching amplifier such as a transistor in a conventional common collector configuration, and through a coupling capacitor 60 to the input of the second stage 18 of compensation. The second stage 18 compensates for the decreasing amplitude of the input signal with frequency.

As shown in FIGURE 1, the second stage 18 includes a pnp transistor 62 in a common emitter configuration. In this connection, the input signal is applied between the base 64 of the transistor and ground. The emitter 66 of the transistor is connected to ground through a series capacitor 68 and resistor 70.

The transistor 62 is biased in a similar manner to the first stage 14 of compensation. In this connection, the negative terminal of the first mentioned power supply is connected to one side of a grounded voltage divider including a pair of interconnected fixed resistors 72 and 74. The base 64 of the transistor 62 is connected to the junction of the pair of fixed resistors 72 and 74. The emitter 66 of the transistor 62 is biased positively by connecting the positive terminal of the second mentioned D.-C. power supply through an isolating resistor 76 to the emitter. The collector 80 of the transistor 62 is biased negatively by suitable means (not shown).

The second stage transistor 62 is biased so that the voltage across the capacitor 68 in the emitter circuit nearly equals the input voltage within the range of reproduced signal frequencies. In this connection, the reactance of the capacitor 68 is made large compared to the base-emitter impedance of the transistor 62. Also to provide the increase in output signal with frequency, the reactance of the emitter capacitor 68 at signal frequencies is made much less than the resistance of the emitter resistor 76. In this way, the output signal from the second stage 18 for a constant amplitude input signal will increase in amplitude in direct proportion to the frequency of the input signal (6 db per octave slope). Since the signal from the first stage 14 decreases in amplitude with frequency, the resulting output signal of the second stage 18 is a signal which is constant with change of frequency (assuming constant amplitude of reproduced signal). The output signal may be coupled to subsequent utilizing circuits (not shown) in the conventional manner.

It should be realized that the first and second stages 14 and 18 of compensation may be interchanged, and the same compensation will result. Also, various networks for producing diverse effects on the signal may be placed between the head circuit 20 and the first stage 14 of compensation, or between the first stage 14 of compensation and the second stage 18 of compensation. Moreover, the resonance compensating circuit may be employed to compensate for the resonance of a plurality of transducer heads which are connected to the resonance compensating circuit in succession. More specifically, the conventional videotape recorder/reproducer employs four transducer heads which are connected through respective amplifiers to a switcher which connects the heads successively to a common output circuit. The above disclosed compensating circuit may be disposed in the common circuit or a separate compensating circuit may be provided for each of the heads.

Also, in certain applications other means may be employed to obtain the compensation of the second stage. For example, the output signal from the first stage may be employed to drive a constant current source which is coupled to an inductive load. The voltage across the inductive load is coupled to the subsequent stages of the reproducer. Also, other means may be employed to obtain the compensation of the first stage of compensation. For example, the output signal from the head circuit may be employed to drive a constant current source which is coupled to a series network including an inductance, a capacitor and a resistance. The voltage across this series network then is employed to drive the second stage of compensation.

The resonance network 32 may be adjusted by the device shown in FIGURE 2 of the drawings. The illustrated device is designed to drive a transmitting coil 82 which is disposed near the transducer head 10 to be compensated. The adjusting circuit includes a video sweep generator 86, which may be of the conventional type, connected through a shielded cable 84 to the series combination of a resistor 88 and the transmitting coil 82. The transmitting coil impedance is made very small compared to that of the resistor 88 and the resistor 88 is selected to match the output impedance of the video sweep generator 86. Thus, the current through the transmitting coil 82 is essentially constant with change of frequency.

A series circuit including a capacitor 90 and a resistor 92 is connected across the resistor-coil combination to provide a constant resistance termination of the sweep generator. In certain applications capacitor 90 and the resistor 92 may be removed. Thus, the generator 86 provides a constant voltage across the terminating load with change of frequency.

The change of flux produced by the transmitting coil 82 is directly proportional to the change of current in the transmitting coil 82 which, in turn, is proportional to the frequency of the generator 86. Therefore, the voltage induced in the transducer head 10 being calibrated is proportional to the frequency of the sweep generator. As explained above, if a constant voltage is induced in the transducer head coil 10, the output signal from the first stage 14 decreases in proportion to the frequency. Therefore, the output signal from the first stage 14 resulting from a voltage induced by the transmitting coil 82 is constant with change of frequency if the resonance network 32 is correctly adjusted. By monitoring the output of the first stage 14, the resonance network 32 may be correctly adjusted.

Various changes and modifications may be made in the above described compensating circuit without deviating from the spirit or scope of this invention.

Various of the features of the present invention are set forth in the accompanying claims.

What is claimed is:

1. A circuit for compensating for distortion caused by resonance of a magnetic transducer head circuit, said circuit comprising first means including an input, a resonance network coupled to said input so that a current which is a direct function of a signal applied to said input flows through said resonance network, and an output which provides a signal related to the current flowing through said resonance network, said network including a resistor, capacitor, and an inductor, said network having the same resonant frequency and Q as the transducer head circuit, and a second means having an output signal which increases in amplitude in proportion to the frequency of the input signal thereto, said head circuit being coupled to the input of one of said means and the input of the other of said means being coupled to the output of said one means.

2. A circuit for compensating for distortion caused by resonance of a magnetic transducer head circuit, said circuit comprising first means including an input, a resonance network coupled to said input so that a current which is a direct function of a signal applied to said input flows through said resonance network, and an output which provides a signal related to the current flowing through said resonance network, said network including a resistor, a capacitor and an inductor coupled in parallel, said network having the same resonant frequency and Q as the transducer head circuit, and a second means having an output signal which increases in amplitude in direct proportion to the frequency of the input signal, said head circuit being coupled to the input of one of said means and the input of the other of said means being coupled to the output of said one means.

3. A circuit for compensating for distortion caused by resonance of a magnetic transducer head circuit, said circuit comprising a first means including a transistor in a common emitter configuration, and a resonance network including a resistor, capacitor and an inductor coupled in parallel in the emitter circuit of said transistor, said transistor being biased so that the internal impedance of the transistor is small compared to the impedance of the resonance network, and a second means having an output signal which increases in amplitude in direct proportion to the frequency of the input signal, said head circuit being coupled to the input of one of said means and the input of the other of said means being coupled to the output of said one means.

4. A circuit for compensating for distortion caused by resonance of a magnetic transducer head circuit, said circuit comprising first means including an input, a resonance network coupled to said input so that a current which is a direct function of a signal applied to said input flows through said resonance network, and an output which provides a signal related to the current flowing through said resonance network, said network including a resistor, capacitor and an inductor coupled in parallel, said network having the same resonant frequency and Q as the transducer head circuit, and a second means including a transistor in a common emitter configuration, a resistor and a capacitor connected in parallel with said resistor in the emitter circuit of said transistor, the reactance of said capacitor being much less than the resistance of said resistor over the operating frequencies of said head circuit, said transistor being biased so that the voltage across the capacitor is nearly equal to the input voltage to said transistor, said head circuit being coupled to the input of one of said means and the input of the other of said means being coupled to the output of said one means.

5. A circuit for compensating for distortion caused by resonance of a magnetic transducer head circuit, said circuit comprising first means including a first transistor in a common emitter configuration and a resonance network in the emitter circuit of said first transistor, said resonance network including a resistor, a capacitor and an inductor coupled in parallel, said first transistor being biased so that the internal emitter impedance of the first transistor is small compared to the impedance of the resonance network, said resonance network having the same resonant frequency and Q as the transducer head circuit, and a second means including a second transistor in a common emitter configuration, a second resistor, and a second capacitor coupled in parallel with said second resistor in the emitter circuit of said second transistor, the reactance of said second capacitor at operating frequencies of said head circuit being much smaller than the resistance of said second resistor, said second transistor being biased so that the voltage across the second capacitor is nearly equal to the input voltages, said head circuit being coupled to the input of one of said means and the input of the other of said means being coupled to the output of said one means.

References Cited by the Examiner

UNITED STATES PATENTS 3,160,824   12/1964   Stair _____ 179—100.2 X

OTHER REFERENCES

Page 134, 1957—Burstein, "Tape Recorder Circuits," Gernsback, New York.

BERNARD KONICK, *Primary Examiner.*

L. G. KURLAND, *Assistant Examiner.*